United States Patent
Lin

(10) Patent No.: US 7,322,069 B1
(45) Date of Patent: Jan. 29, 2008

(54) AUTOMOBILE SIDE WINDOW WIPER

(76) Inventor: Chiang-Fen Lin, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 11/508,967

(22) Filed: Aug. 24, 2006

(51) Int. Cl.
*B60S 1/56* (2006.01)
*B60S 1/26* (2006.01)

(52) U.S. Cl. ............. 15/250.3; 15/250.1; 15/250.3
(58) Field of Classification Search .......... 15/250.001, 15/250.3, 250.003, 250.1
See application file for complete search history.

(56) References Cited

U.S. PATENT DOCUMENTS 7,222,384 B1 * 5/2007 Lin .................. 15/250.003

FOREIGN PATENT DOCUMENTS

| JP | 57-209448 | * | 12/1982 |
| JP | 59-149848 | * | 8/1984 |
| JP | 61-155043 | * | 7/1986 |
| JP | 63-43852 | * | 2/1988 |
| JP | 1-275242 | * | 11/1989 |
| KR | 98047287 | * | 9/1998 |

* cited by examiner

*Primary Examiner*—Gary K. Graham

(57) ABSTRACT

An automobile side window wiper includes a fix base fixed on a side window, a transmission device installed on the fix base, a connect rod, and a wiper. The fix base has a shaft hole, and the transmission device has a motor, a rotary shaft extending from one side and further in the shaft hole of the fix base. The connect rod is connected to the rotary shaft, and the wiper is fitted around the connect rod, having a wiping surface contacting the side window glass. The fix base is fixed on a connect base of a rearview mirror. The wiper is moved by the transmission device to swing up and down, sweeping off raindrops on the side window glass, with the outer end portion bent and resting on an extension of the connect base so that the wiper can be received in the connect base when not used.

4 Claims, 9 Drawing Sheets

AUTOMOBILE SIDE WINDOW WIPER

BACKGROUND OF THE INVENTION

1. Field of the Invention

This invention relates to an automobile side window wiper, particularly to one wiping raindrops on a side window of an automobile so as to see through clearly for looking at a rear-view mirror, with a collapsible structure in a connect base of the rearview mirror.

2. Description of the Prior Art

A driver of an automobile usually looks at the left and the right rearview mirror for checking vehicles coming behind during running of the automobile so that he can turn, outstrip other vehicles, change a lane or stop the automobile. In case of rain, side windows of the automobile may be drenched with raindrops to blur the window glass, resulting in impossibility of seeing through the side window to check the traffic condition behind his car on the rearview mirror. Then it is hard to drive safely, causing potential accidents in case of careless driving. However, should there be a wiper on a side window, it might look not decent owning to being not hidden during when it is not used. Moreover, if the wiper is always in contact with the window glass, it may glue with it, and in addition, it may soften by hot sunshine, so the oil in the wiper may flow into caterpillar holes of the window glass to blur the window glass.

SUMMARY OF THE INVENTION

The purpose of the invention is to offer an automobile side window wiper for wiping raindrops off the glass of a side window so that the side window is cleaned, enabling a driver to see through the side window for looking at a rearview mirror located outside the side window.

The features of the invention are a fix base fixed on a side window, a transmission device fixed inside the fix base, a connect rod and a wiper. The fix base has a shaft hole, and the transmission device has a rotary shaft extending to an outer side of the fix base. The connect rod is connected to the rotary shaft and located at the outer side of the fix base, and the wiper is attached on the connect rod, having a wiping surface contacting the outer surface of the glass of a side window. The fix base is fixed with a connect base of a rear view mirror, and the connect base has an extension at one side for the wiper to rest on.

The wiper is swung up and down on the outer surface of the glass of the side window to wipe off raindrops when the motor is started to drive the transmission device and then the rotary shaft, and then the connect rod together with the wiper is swung up and down by the rotary shaft.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
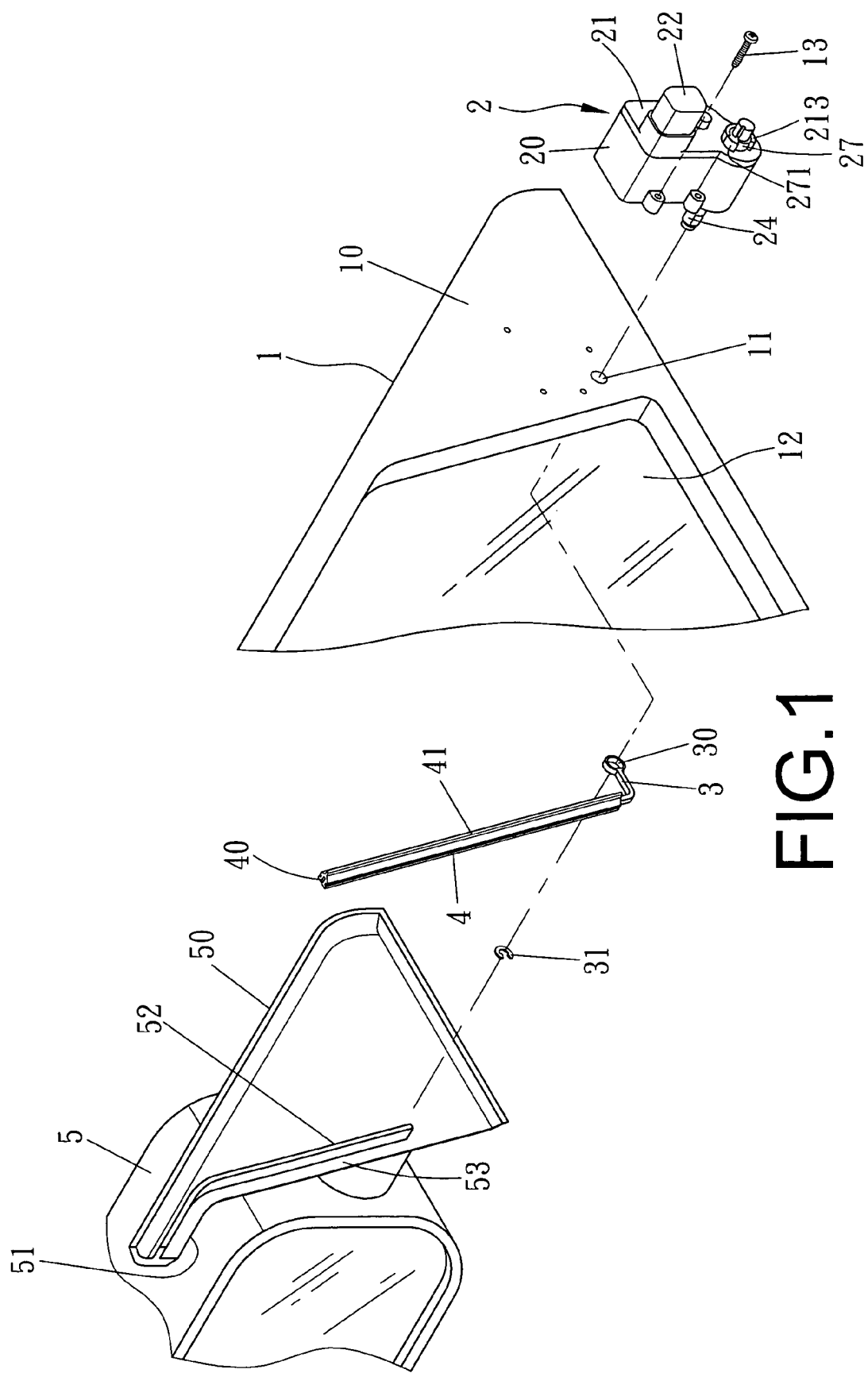
FIG. 1 is an exploded perspective view of an automobile side window wiper in the present invention.

A preferred embodiment of an automobile side window wiper in the present invention, as shown in FIGS. 1-5, includes a fix base 10, a transmission device 2, a connect rod 3, and a wiper 4 as main components combined on a side window of an automobile.

The fix base 10 is fixed at a front end of a side window, provided with a shaft hole 11, and a fastening member 13 fixing the transmission device 2 on the fix base.

The transmission device 2 is composed of a shell 20, a cap 21 closing a vertical side of the shell 20, a motor 22, a speed-changing gear unit 23, a rotary shaft 24, a coiled spring 25, a driven gear 26, and an annular stopper 27.

Figure 2:
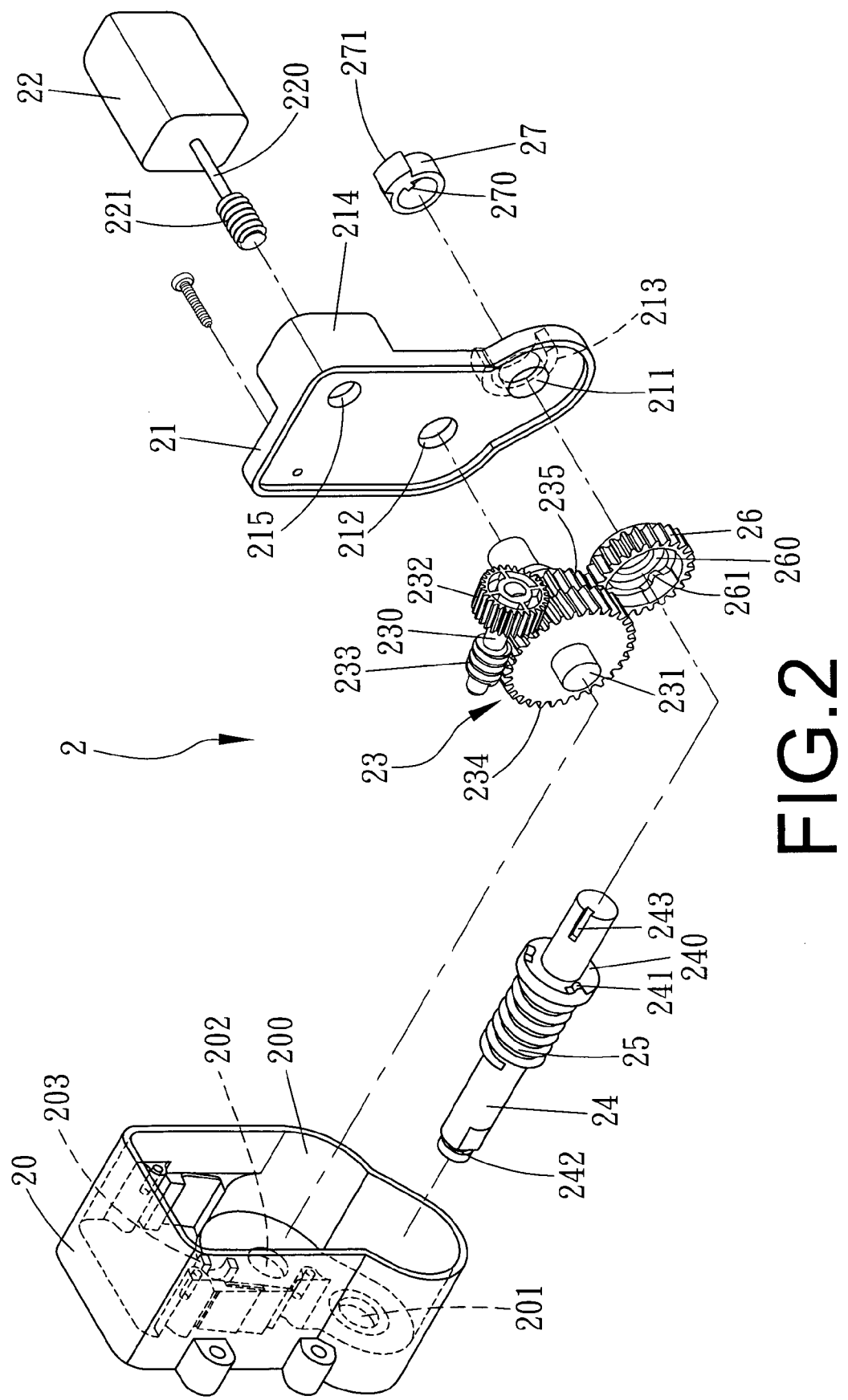
FIG. 2 is an exploded perspective view of a transmission device in the present invention.
Figure 3:
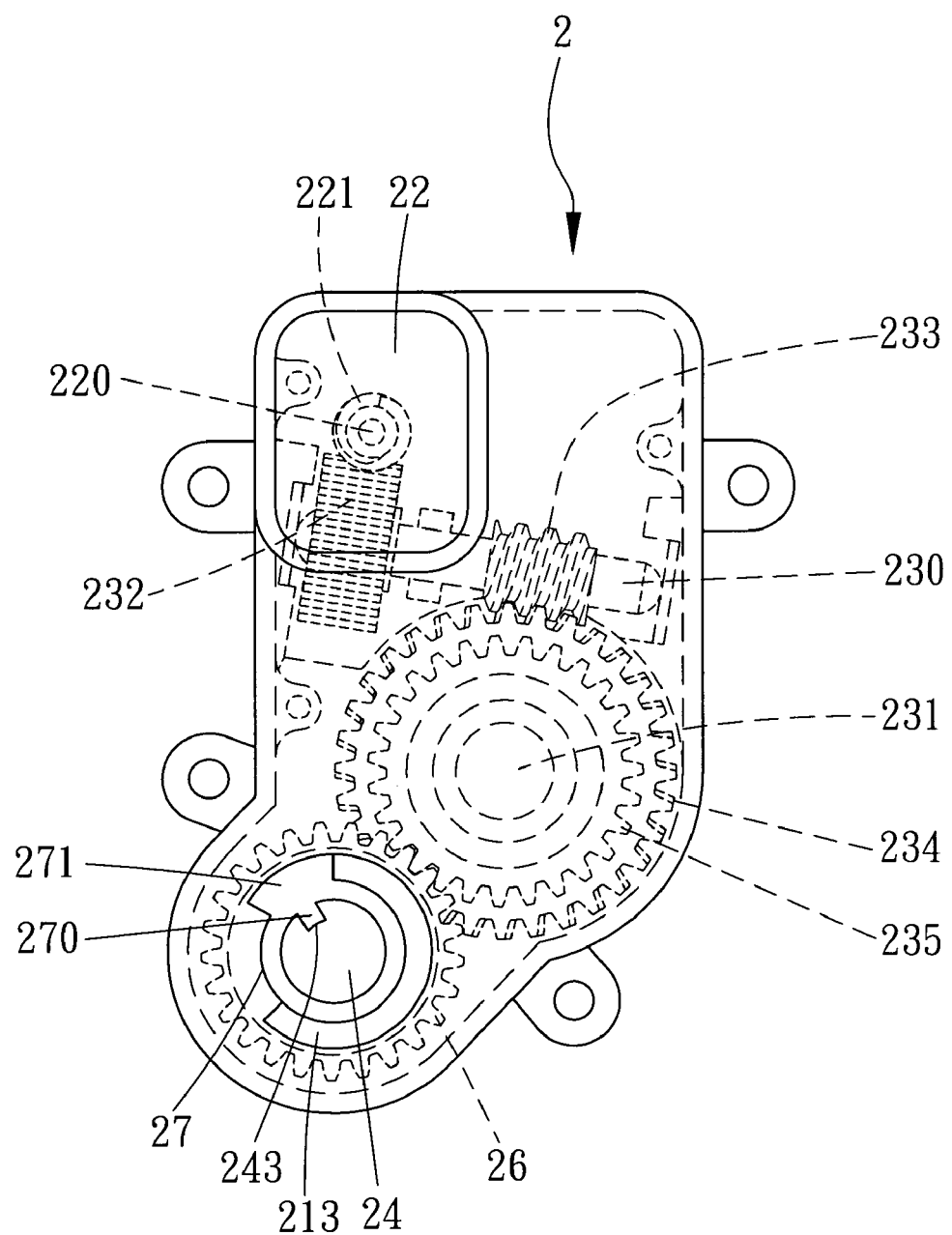
FIG. 3 is a cross-sectional enlarged view of the transmission device in the present invention.

The shell 20 is provided with a chamber 200, as shown in FIGS. 2 and 3, a shaft hole 201 in an inner side of a rear wall to correspond to a shaft hole 211 of the cap 21, and a position member 203 in the interior.

The cap 21 is provided with the shaft hole 211, a stopper 213 projecting on an outer surface, and a motor base 214 formed on the outer surface and bored with a hole 215.

The motor 22 is fixed firmly with the motor base 214, having a spindle 220 with a drive worm 221 fixed thereon and extending in the hole 215 of the motor base 214 and further into the chamber 200 of the shell 20.

The speed-changing gear unit 23 is deposited in the chamber 200 of the shell 20, composed of two shafts 230 and 231, a drive worm gear 232 and a driven worm 233 fixed on the shaft 230. The drive worm gear 232 engages with the drive worm 221 of the motor 22. On the shaft 231 are fixed a driven worm gear 234 and a drive gear 235, and the driven worm gear 234 engages with the driven worm 233. The shaft 230 is positioned on the position member 203 of the shell 20, and the two ends of the shaft 231 are fitted in the position holes 202 and 212 of the shell 20 and the cap 21 respectively.

The rotary shaft 24 extends in the shaft holes 201 and 211 of the shell 20 and the cap 21 respectively, provided with an annular flange 240 in an intermediate portion, with plural fit projections 241 formed on an outer surface of the annular flange 240, an annular groove 242 formed in a first end, and a fit slot 243 formed in a second end.

The coiled spring 25 is fitted around the rotary shaft 24 behind the flange 241, having a first end held in the chamber 200 of the shell 20 and a second end resting on a rear side of the annular flange 240.

Next, the driven gear 26 is fixed on a front-end portion of the rotary shaft 24, provided with a recessed room 260 for the flange 240 to fit therein, and the recessed room 260 is provided with plural fit groove 261 for the fit projection 241 of the rotary shaft 24 to fit therein.

The annular stopper 27 is fitted around the front end of the rotary shaft 24, provided with an inner projection 270 fitting movably in the fit slot 243 of the rotary shaft 24, and an outward projection 271 to be stopped by a stopper 213 of the cap 21, with the rotary shaft 24 extending in the shaft hole 11 of the fix base 10.

The L-shaped connect rod 3 is connected with the rotary shaft 24, provided with a shaft hole 30 at a lower end of a bent horizontal portion, laid on an outer surface of the fix base 10 positioned at the front side of a side window, and also fixed with the rotary shaft 24 with a fastening member 31.

The elongate wiper 4 is combined around the connect rod 3, made of soft material, with an elastic member 40 fixed inside the wiper 4 for bolstering the wiper 4 elastically. The wiper 4 has a wiping surface 41, which contacts closely the outer surface of the glass 12 of the side window 1.

Next, a rearview mirror 5 is provided with a connect base 50, which is connected with the fix base 10 and has an extension 51 toward one side, and an elongate stop edge 52 formed in an inner side and an elongate recess 53 formed beside the stop edge 52 for the wiper 4 to be fitted in if it is not to be used. Thus the side window wiper is installed on the fix base fixed the side window of an automobile and also connected with the connect base 50.

Figure 7:
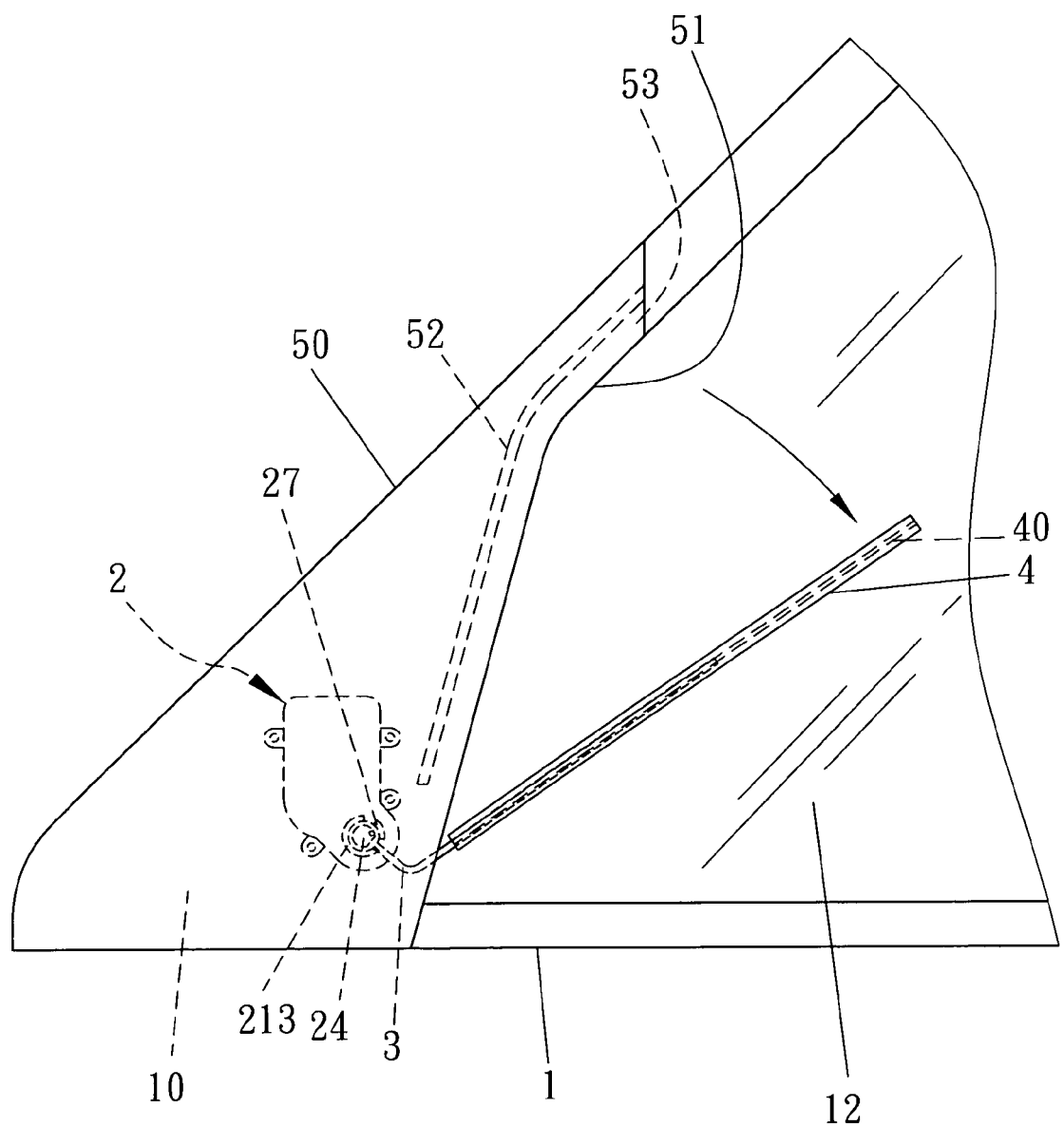
FIG. 7 is a front cross-sectional view of the automobile side window wiper in the present invention, showing the wiper under second moving condition.
Figure 8:
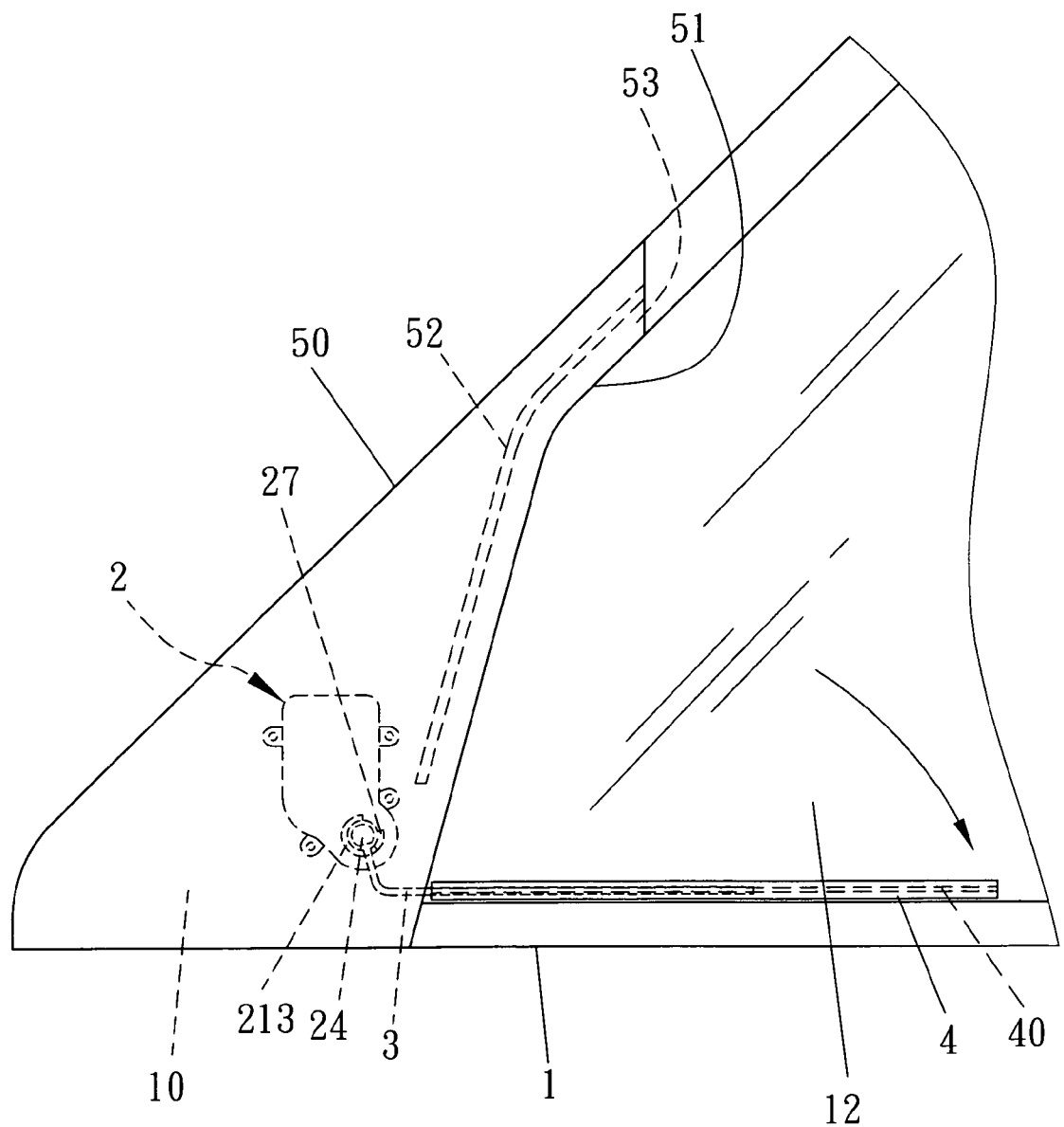
FIG. 8 is a front cross-sectional view of the automobile side window wiper in the present invention, showing the wiper under a third moving condition; and, FIG. 9 is a side cross-sectional view of the automobile side window in the present invention, showing a gap formed between the wiper and a side window glass.

In using, as shown in FIGS. 4-8, if the glass 12 of a side window 1 of an automobile is drenched with rain, the motor 22 of the transmission device 2 is started to rotate the drive worm 221, which then rotates the drive worm gear 232. Then accordingly the shaft 230 is rotated by the drive worm gear 232, with the driven worm 233 and the shaft 231 rotated. Next, the driven worm 233 drives the driven gear worm 234, and then the drive gear 235, which then rotates the driven gear 26 on with the rotary shaft 24. So the connect rod 3 is driven by the rotary shaft 24, with the wiper 4 fixed on the connect rod 3 swung for an angle so that the wiper 4 bent a little in an upper position swings down from the upper edge of the side window 1 and straightens by means of recovered resilience of the elastic member, as shown in FIGS. 7 and 8. When the wiper 4 reaches the lower edge of the side window 1, the stopper 27 of the rotary shaft 24 comes to contact the side edge of the stopper 213 of the cap 21, blocking the rotary shaft 24 from rotating, so the motor 22 continues to rotate, increasing the torque to be forced to reverse its rotation direction. Then the rotary shaft 24 is then rotated also reversely to swing up the wiper 4, which then sweeps and cleans away raindrops on the glass 12 of the side window 1. When the wiper 4 reaches the upper edge of the side window 1 again, the annular flange 271 of the stopper 27 of the rotary shaft 24 comes to contact the outer edge of the stopper 213 of the cap 21, becoming impossible to rotate any more, with the motor 22 reversing its rotating direction, to rotate in the original direction, and then driving the rotary shaft 24 in the same way as described above. Thus the wiper 4 repeats the movement of swing up and down on the side window 1, cleaning raindrops on the outer surface of the glass 12 of the side window 1. Then a driver can see through the side window clearly to look at the rearview mirror.

Figure 4:
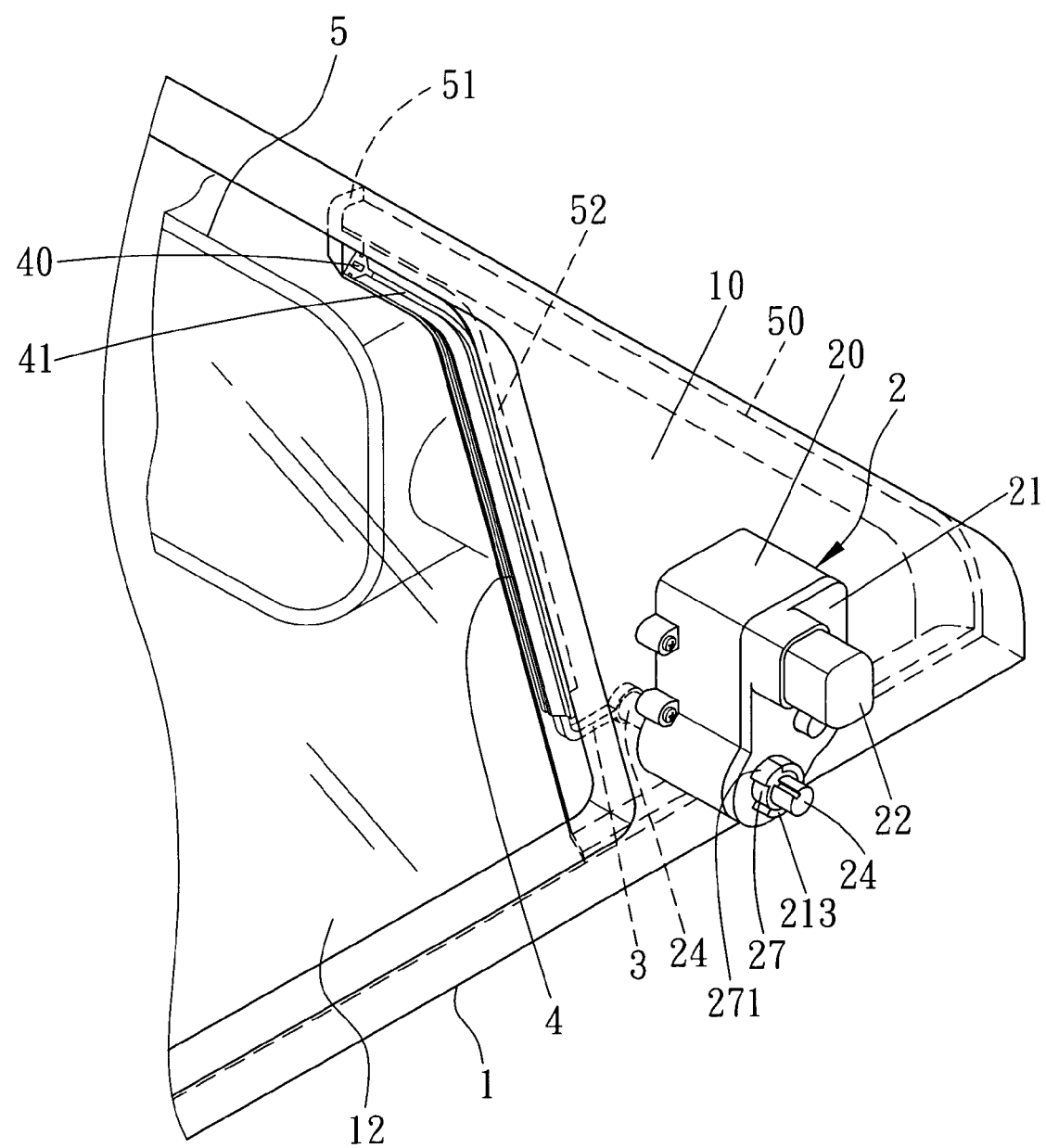
FIG. 4 is a perspective view of the automobile side window wiper in the present invention.
Figure 5:
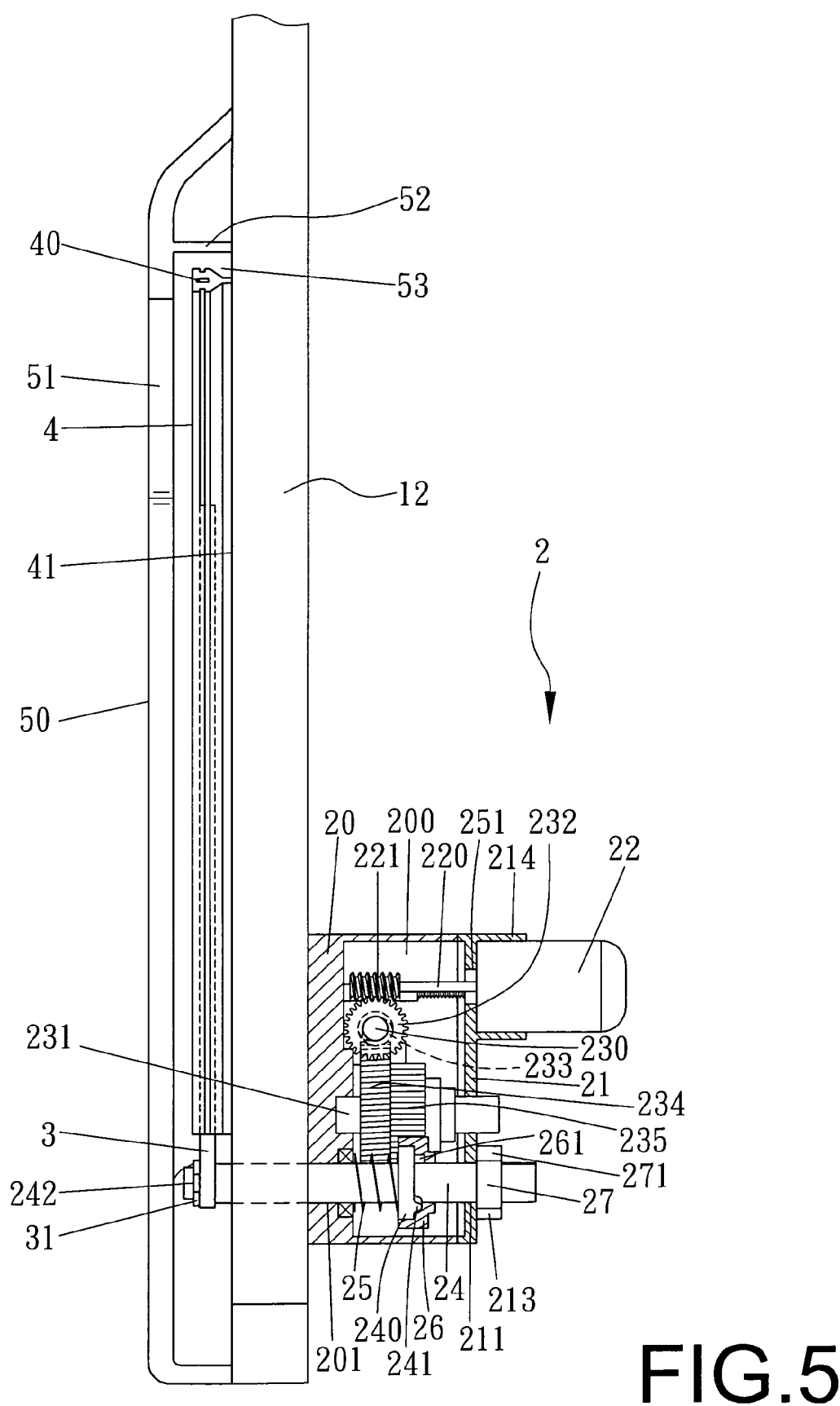
FIG. 5 is a side cross-sectional view of the automobile side window wiper in the present invention.
Figure 6:
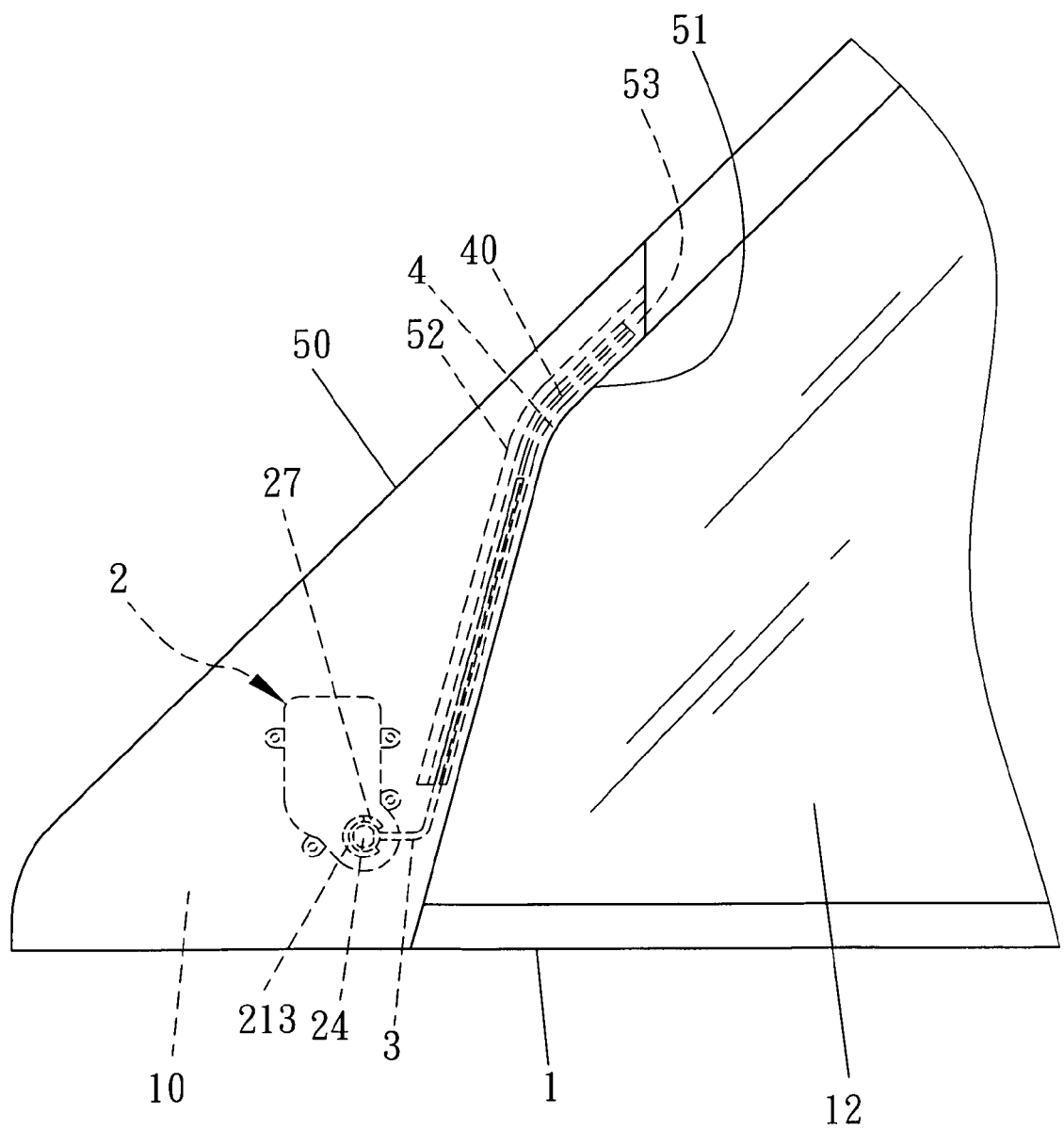
FIG. 6 is a front cross-sectional view of the automobile side window wiper in the present invention, showing the wiper under a first moving condition.
Figure 9:
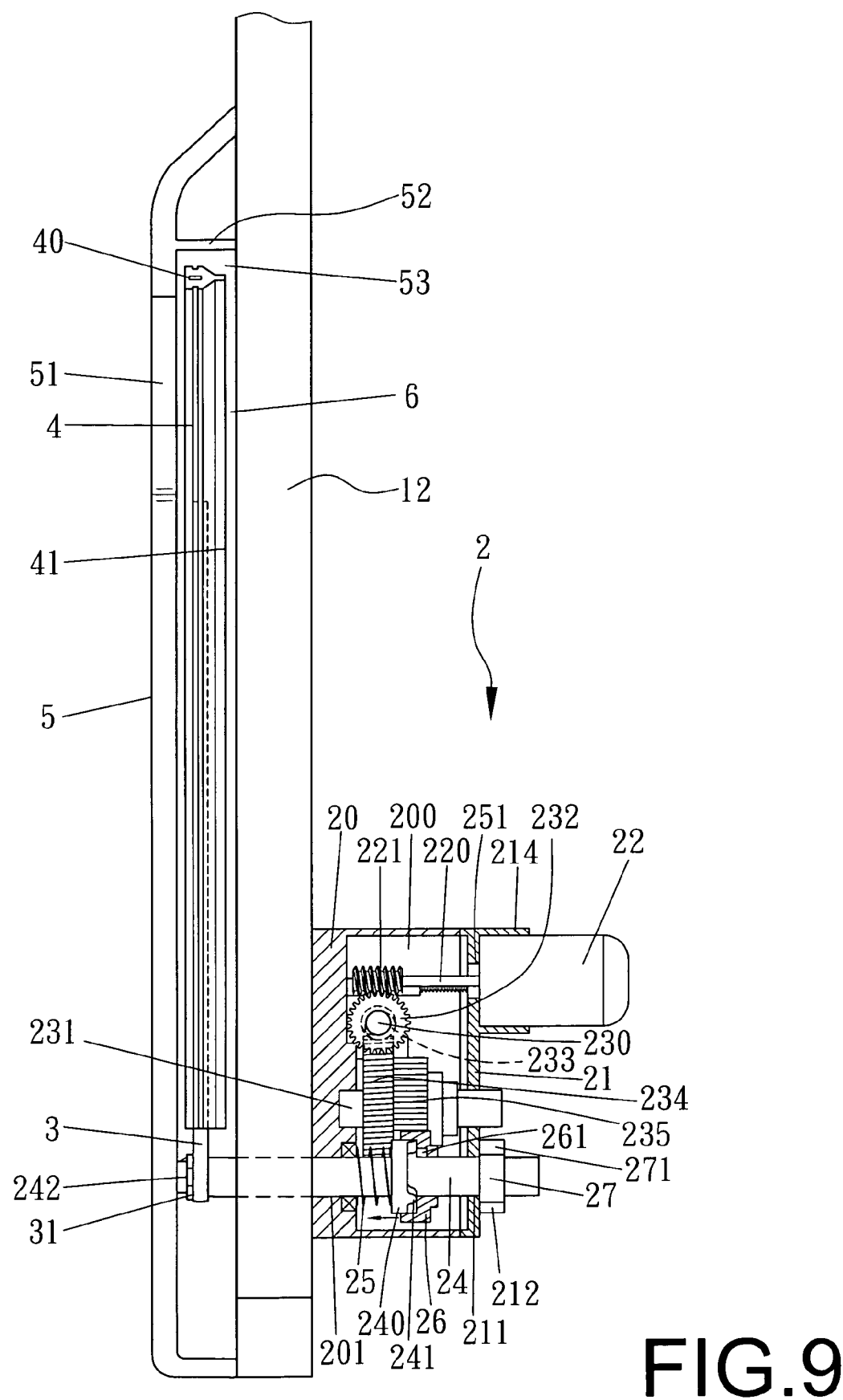

On the contrary, if the wiper 4 is not used any longer, it can be moved to swing up to the upper edge of the side window 1, and then moves into the elongate recess 53 of the connect base 50 of the rearview mirror 5. As shown in FIGS. 4, 5 and 9, when the driven gear 26 is rotated a little by the drive gear 235, the rotary shaft 24 can no longer rotate owing to the wiper 4 stopped by the stop edge 52 of the connect base 50. Then the flange 241 of the rotary shaft 24 separates from the fit groove 261 of the driven gear 26, resting on an inner surface of the recess 260. Then the rotary shaft 24 can be pushed forward to compress the coiled spring 25 as shown in FIG. 9, moving the connect rod 3 together with the wiper 4 forward accordingly. Then a gap 6 may be formed between the glass 12 of the side window 1 and the wiping surface 41 of the wiper 4, preventing the wiper 4 from contacting the glass 12 constantly. Then the wiper 4 may not glue to the glass 12 or soften by sunlight to hampering oily substance from simmering into the caterpillar holes of the glass 12 so that the glass 12 can be kept clear. Therefore, the wiper 4 can prolong its service life, in addition to good appearance of the side window 1 with the wiper 4 hidden in the elongate recess 53 in case of not used.

When the wiper 4 is to be used again, the motor 22 is started to drive the transmission device 2 to rotate the driven gear 26 again, which has its fit groove 261 fitting with the flange 241 of the rotary shaft 24, and with the resilience of the coiled spring 25, the rotary shaft 24 can be pushed back to the original position, letting the flange 241 of the rotary shaft 24 fitting in the fit groove 261 of the driven gear 26. Then the wiping surface 41 of the wiper 4 contacts the glass 12 of the side window 1 and sweeps raindrops away, very convenient to use.

While the preferred embodiment of the invention has been described above, it will be recognize and understood that various modifications may be made therein and the appended claims are intended to cove all such modifications that may fall within the spirit and scope of the invention.

What is claimed is:

1. An automobile side window wiper comprising:
 a fix base fixed on an automobile side window and provided with a shaft hole;
 a transmission device installed on an inner surface of said fix base, said transmission device having a rotary shaft extending to an outer side of said fix base;
 a connect rod connected to said rotary shaft and positioned at the outer side of said fix base;
 a wiper fixed around on said connect rod and having a wiping surface contacting an outer surface of a glass of said side window; and,
 a connect base combined with a rearview mirror positioned at the outer side of said fix base and provided with an extension toward a first side and an elongate stop edge and an elongate recess beside said elongate stop edge in an inner surface of said connect base; and
 wherein said transmission device is composed of a shell, a cap closing on a vertical side of said shell, a motor, a drive worm, a speed-changing gear unit, and said shell and said cap both have a shaft hole to correspond to each other, said motor fixed with said cap and having a spindle with a drive worm fixed thereon extending in said shell, said drive worm engaging with said speed-changing gear unit that is composed of two shafts intercrossing with each other, a drive worm gear and a driven worm fixed on a first of said two shafts, said drive worm gear engaging with said drive worm of said motor, a driven worm gear and a drive gear fixed on a second of said two shafts, said driven worm gear engaging with said driven worm, said rotary shaft extending in said shaft hole of said shell and said cap, a driven gear fixed on said rotary shaft and engaging with said drive gear.

2. The automobile side window wiper as claimed in claim 1, wherein said driven gear is provided with a recessed room, said recessed room is provided with a fit groove in an inner surface, said rotary shaft is provided with a flange in an intermediate portion, said flange provided with plural fit projections on its outer side surface, a coiled spring fitted around said rotary shaft.

3. The automobile side window wiper as claimed in claim 1, wherein an annular stopper is fitted around said rotary shaft, said annular stopper provide with an inward projection, said cap provided with a stopper on its outer surface.

4. The automobile side window wiper as claimed in claim 1, wherein said wiper has an elastic member inside.

* * * * *